US011918009B2

(12) United States Patent
Vulava et al.

(10) Patent No.: US 11,918,009 B2
(45) Date of Patent: Mar. 5, 2024

(54) REFRIGERATOR APPLIANCE HAVING ONE OR MORE INCORPORATED FEATURES FOR MAKING ICE CREAM

(71) Applicant: Haier US Appliance Solutions, Inc., Wilmington, DE (US)

(72) Inventors: Gopi Krishna Chowdary Vulava, Louisville, KY (US); Roger Shawn Nelson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/721,772

(22) Filed: Apr. 15, 2022

(65) Prior Publication Data

US 2023/0329280 A1   Oct. 19, 2023

(51) Int. Cl.
| | |
|---|---|
| *A23G 9/12* | (2006.01) |
| *A23G 9/22* | (2006.01) |
| *A23G 9/28* | (2006.01) |
| *F25D 17/06* | (2006.01) |
| *F25D 17/08* | (2006.01) |
| *F25D 23/12* | (2006.01) |

(52) U.S. Cl.
CPC ............... *A23G 9/12* (2013.01); *A23G 9/222* (2013.01); *A23G 9/281* (2013.01); *A23G 9/287* (2013.01); *F25D 17/062* (2013.01); *F25D 17/08* (2013.01); *F25D 23/12* (2013.01); *F25D 2317/0672* (2013.01)

(58) Field of Classification Search
CPC .......... A23G 9/00–9/228; A23G 9/281; A23G 9/287; F25D 23/12; F25D 17/062; F25D 17/08; F25D 2317/0672
See application file for complete search history.

(56) References Cited

U.S. PATENT DOCUMENTS

| 3,988,902 A | 11/1976 | Jacobs |
| 4,450,692 A | 5/1984 | Sharpe et al. |

(Continued)

FOREIGN PATENT DOCUMENTS

| CA | 1194324 A1 | 10/1985 |
| CN | 104279828 B | 8/2016 |

(Continued)

OTHER PUBLICATIONS

English language machine translation of EP 2402690, translated Jun. 2023 (Year: 2012).*

*Primary Examiner* — Cassey D Bauer
(74) *Attorney, Agent, or Firm* — Dority & Manning, P.A.

(57) ABSTRACT

A refrigerator appliance may include a cabinet, a door, a sealed cooling system, and an ice cream unit. The door may include a door liner defining an icebox compartment. The door may include a chilled air supply opening and a chilled air return opening spaced apart from the chilled air supply opening. The ice cream unit may be disposed within the icebox compartment. The ice cream unit may include a freezing tank, a rotatable auger extending into the freezing tank, a tank jacket, and a unit duct or support base. The tank jacket may receive the freezing tank and define a cooling passage extending about the freezing tank from a jacket inlet to a jacket outlet. The jacket outlet may be open to the icebox compartment to exhaust air from the cooling passage to the icebox compartment.

20 Claims, 14 Drawing Sheets

(56) References Cited

U.S. PATENT DOCUMENTS

| | | | |
|---|---|---|---|
| 4,773,233 A | 9/1988 | Kawasumi et al. | |
| 6,244,061 B1 | 6/2001 | Takagi et al. | |
| 6,250,794 B1 | 6/2001 | Huang | |
| 6,267,049 B1 | 7/2001 | Silvano | |
| 6,918,258 B2 | 7/2005 | Cunha et al. | |
| 8,756,950 B2 | 6/2014 | Brunner et al. | |
| 9,182,162 B2 | 11/2015 | Culley et al. | |
| 9,816,748 B2 | 11/2017 | Akan et al. | |
| 9,993,015 B2 | 6/2018 | Geng et al. | |
| 2003/0131541 A1 | 7/2003 | Lee et al. | |
| 2007/0163286 A1 | 7/2007 | Lim et al. | |
| 2011/0120152 A1 | 5/2011 | Talegaonkar et al. | |
| 2011/0308269 A1 | 12/2011 | Mitchel et al. | |
| 2012/0036882 A1 | 2/2012 | Park et al. | |
| 2012/0198870 A1 | 8/2012 | Erbs et al. | |
| 2013/0025303 A1 | 1/2013 | Yoon et al. | |
| 2015/0216201 A1 | 8/2015 | Bruckner et al. | |
| 2016/0370051 A1 | 12/2016 | Yun | |
| 2017/0332658 A1 | 11/2017 | Mitchel et al. | |

FOREIGN PATENT DOCUMENTS

| | | | | |
|---|---|---|---|---|
| EP | 0138514 | * | 4/1985 | ............... A23G 9/06 |
| EP | 2402690 | * | 1/2012 | ............... A23G 9/12 |
| JP | 2008142017 A | | 6/2008 | |
| JP | 2008263861 A | | 11/2008 | |
| KR | 20070096516 A | | 10/2007 | |
| WO | WO2002033333 A1 | | 4/2002 | |

\* cited by examiner

REFRIGERATOR APPLIANCE HAVING ONE OR MORE INCORPORATED FEATURES FOR MAKING ICE CREAM

FIELD OF THE INVENTION

The relates generally refrigerator appliances, and more particularly to refrigerator appliances including features for making ice cream within the refrigerator appliance.

BACKGROUND OF THE INVENTION

Certain refrigerator appliances utilize sealed systems for cooling chilled chambers of the refrigerator appliances. A typical sealed system includes an evaporator and a fan, the fan generating a flow of air across the evaporator and cooling the flow of air. The cooled air is then provided through an opening into the chilled chamber to maintain the chilled chamber at a desired temperature. Air from the chilled chamber is circulated back through a return duct to be re-cooled by the sealed system during operation of the refrigerator appliance, maintaining the chilled chamber at the desired temperature. An ice making device is often provided and disposed within the chilled chamber.

Separate from a refrigerator, appliances exist for making ice cream. Such appliances often include a freezing tank and an auger therein. The tank or auger may be configured to rotate relative to each other. A series of heat exchange pipes or a bucket to hold ice may also be included to directly contact the tank. Heat exchange between the pipes (or ice) and the tank may significantly reduce the temperature within the tank. One or more liquid ingredients for the ice cream may be provided within the tank. During use, the ingredients may be mixed and at least partially frozen until a desired temperature or consistency is reached.

Although ice cream appliances exist, due to the specialized nature of such appliances and the extensive assembly/disassembly required, they often go unused by consumers. Also, many require direct supervision or input (e.g., to rotate the auger or tank). Many consumers only desire fresh ice cream during select occasions, so sacrificing money and or space for an independent appliance may be undesirable.

Accordingly, an unobtrusive appliance for making and storing ice cream would be useful. It would be advantageous if such an appliance was incorporated within a refrigerator appliance without sacrificing storage or ice cream consistency. More particularly, it would be useful to provide a refrigerator appliance with a selectively removable unit for making and storing ice cream.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a sealed cooling system, and an ice cream unit. The cabinet may define a chilled chamber. The door may be attached to the cabinet to selectively restrict access to the chilled chamber. The door may include a door liner defining an icebox compartment. The door may include a chilled air supply opening and a chilled air return opening spaced apart from the chilled air supply opening. The sealed cooling system may be in fluid communication with the icebox compartment to circulate air within the refrigerator appliance. The ice cream unit may be disposed within the icebox compartment. The ice cream unit may include a freezing tank, a rotatable auger extending into the freezing tank, a tank jacket, and a unit duct. The tank jacket may receive the freezing tank and define a cooling passage extending about the freezing tank from a jacket inlet to a jacket outlet. The jacket outlet may be open to the icebox compartment to exhaust air from the cooling passage to the icebox compartment. The unit duct may extend from the chilled air supply opening to the jacket inlet to direct air from the chilled air supply opening to the cooling passage.

In another exemplary aspect of the present disclosure, a refrigerator appliance is provided. The refrigerator appliance may include a cabinet, a door, a sealed cooling system, and an ice cream unit. The cabinet may define a chilled chamber. The door may be attached to the cabinet to selectively restrict access to the chilled chamber. The door may include a door liner defining an icebox compartment. The door may include a chilled air supply opening and a chilled air return opening spaced apart from the chilled air supply opening. The door may also define a dispenser outlet spaced apart from the chilled air supply opening and the chilled air return opening. The sealed cooling system may be in fluid communication with the icebox compartment to circulate air within the refrigerator appliance. The ice cream unit may be disposed within the icebox compartment. The ice cream unit may include a freezing tank, a rotatable auger extending into the freezing tank, a tank jacket, and a unit duct. The tank jacket may receive the freezing tank and define a cooling passage extending about the freezing tank from a jacket inlet to a jacket outlet. The jacket outlet may be open to the icebox compartment to exhaust air from the cooling passage to the icebox compartment. The support base may hold the tank jacket. The support base may be disposed above and cover the dispenser outlet to block air from the icebox compartment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
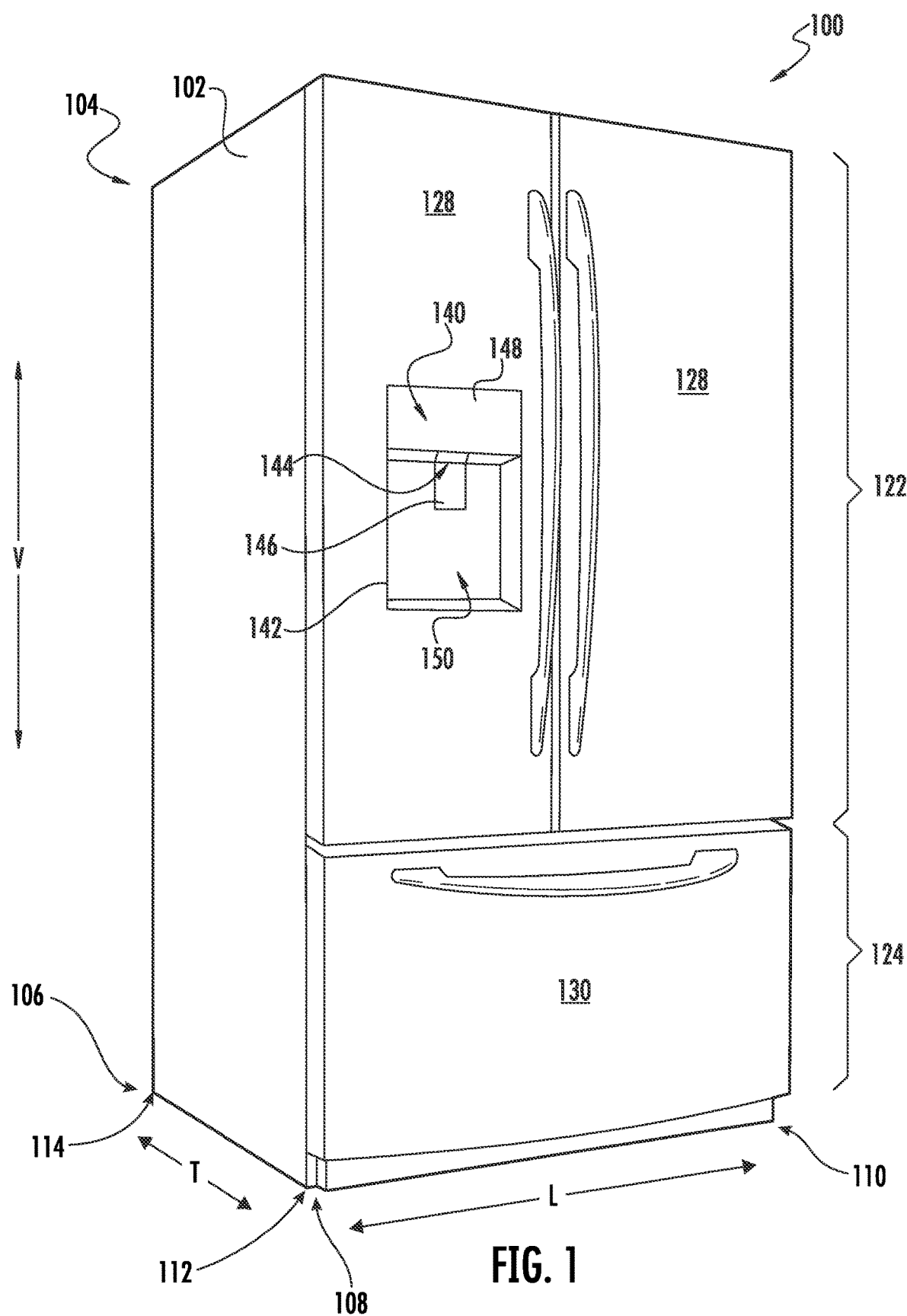
FIG. 1 provides a perspective view of a refrigerator appliance according to example embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, a refrigerator appliance is provided and includes a removable ice cream unit. Generally, the ice cream unit may be selectively installed or uninstalled by a user. For example, an ice dispenser unit within a door of the refrigerator may be swapped for the ice cream unit as needed. A motor that drives the ice dispenser unit may be used to drive the ice cream unit, advantageously reducing the complexity of installation and the number of different parts to be swapped.

Figure 2:
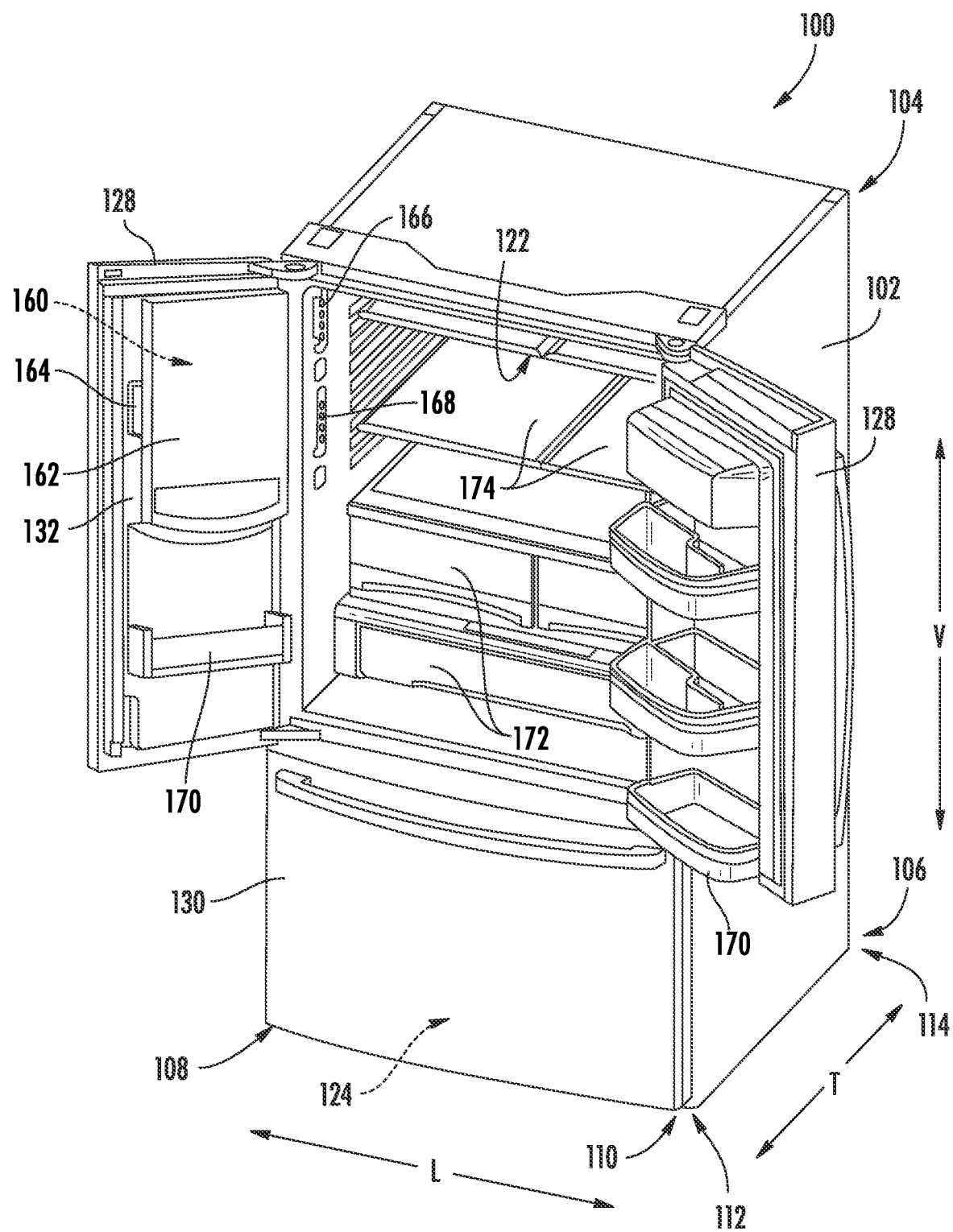
FIG. 2 provides a perspective view of a door of the exemplary refrigerator appliance of FIG. 1.

Turning to the figures, FIGS. 1 and 2 illustrate a perspective view of a refrigerator 100. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

According to the illustrated embodiment, various storage components are mounted within fresh food chamber 122 to facilitate storage of food items therein as will be understood by those skilled in the art. In particular, the storage components include bins 170, drawers 172, and shelves 174 that are mounted within fresh food chamber 122. Bins 170, drawers 172, and shelves 174 are positioned to receive of food items (e.g., beverages or solid food items) and may assist with organizing such food items. As an example, drawers 172 can receive fresh food items (e.g., vegetables, fruits, or cheeses) and increase the useful life of such fresh food items.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1.

Refrigerator appliance 100 also includes a delivery assembly 140 for delivering or dispensing liquid water or ice. Delivery assembly 140 includes a dispenser 142 positioned on or mounted to an exterior portion of refrigerator appliance 100, e.g., on one of refrigerator doors 128. Dispenser 142 includes a dispenser outlet 144 for accessing ice and liquid water. An actuating mechanism 146, shown as a paddle, is mounted below dispenser outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A control panel 148 is provided for controlling the mode of operation. For example, control panel 148 includes a plurality of user inputs (not labeled), such as a water dispensing button and an ice-dispensing button, for selecting a desired mode of operation such as crushed or non-crushed ice.

Dispenser outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open refrigerator doors 128. In the exemplary embodiment, dispenser recess 150 is positioned at a level that approximates the chest level of a user. As described in more detail below, the dispensing assembly 140 may receive ice from an icemaker 210 disposed in a sub-compartment of the fresh food chamber 122.

FIG. 2 provides a perspective view of a door 128 of refrigerator appliance 100 shown with refrigerator doors 128 in the open position. As shown, at least one door 128 includes a door liner 132 defining a sub-compartment, e.g., icebox compartment 160. Icebox compartment 160 extends into fresh food chamber 122 when refrigerator door 128 is in the closed position. Although icebox compartment 160 is shown in door 128, additional or alterative embodiments may include an icebox compartment 160 defined within door 130. As discussed in greater detail below, an ice making assembly or icemaker 210 may be positioned or disposed within icebox compartment 160. In optional embodiments, an ice dispenser unit 220 (see FIG. 4) may also be selectively positioned within icebox compartment 160. Thus, ice may be supplied to dispenser recess 150 (see FIG. 1) from the icemaker 210 or ice dispenser unit 220 in icebox compartment 160 on a back side of refrigerator door 128.

An access door—e.g., icebox door 162—may be hinged to icebox compartment 160 to selectively cover or permit access to opening of icebox compartment 160. Icebox door 162 permits selective access to icebox compartment 160. Any manner of suitable latch 164 is provided with icebox compartment 160 to maintain icebox door 162 in a closed position. As an example, latch 164 may be actuated by a consumer in order to open icebox door 162 for providing access into icebox compartment 160. Icebox door 162 can also assist with insulating icebox compartment 160, e.g., by thermally isolating or insulating icebox compartment 160 from fresh food chamber 122. Generally, this thermal insulation helps maintain icebox compartment 160 at a temperature below the freezing point of water.

In addition, icebox compartment 160 may receive cooling air from a chilled air supply duct 166 and a chilled air return duct 168 disposed on a side portion of housing 102 of refrigerator appliance 100. In this manner, the supply duct 166 and return duct 168 may recirculate chilled air from a suitable sealed cooling system 180 (see FIG. 3) through icebox compartment 160. Turning further to FIG. 4, which provides an exploded perspective view of a portion of the door 128, door 128 may define a pair of openings correspond to the ducts 166, 168. Specifically, door 128 defines a chilled air supply opening 134 and a chilled air return opening 136. The chilled air supply opening 134 corresponds to the chilled air supply duct 166 and, thus, is disposed at a common vertical height with the outlet aperture of chilled air supply duct 166 such that air can flow from chilled air supply duct 166 to the icebox compartment 160 through chilled air supply opening 134 (e.g., when door 128 is in the closed position). When assembled, chilled air supply opening 134 may be aligned with icemaker 210 and direct air thereto. For instance, chilled air supply opening 134 may be disposed at a common vertical height with icemaker 210 (e.g., above dispenser outlet 144). During certain operations, chilled air (e.g., from evaporator 188 and chilled air supply duct 166) may flow to icemaker 210 and may assist ice formation by icemaker 210.

The chilled air return opening 136 is spaced apart from (e.g., disposed below) the chilled air supply opening 134 and corresponds to the chilled air return duct 168. In turn, chilled air return opening 136 is disposed at a common vertical height with the outlet aperture of chilled air supply duct 166 such that air can flow from chilled air supply duct 166 to the icebox compartment 160 through chilled air supply opening 134 (e.g., when door 128 is in the closed position).

Figure 3:
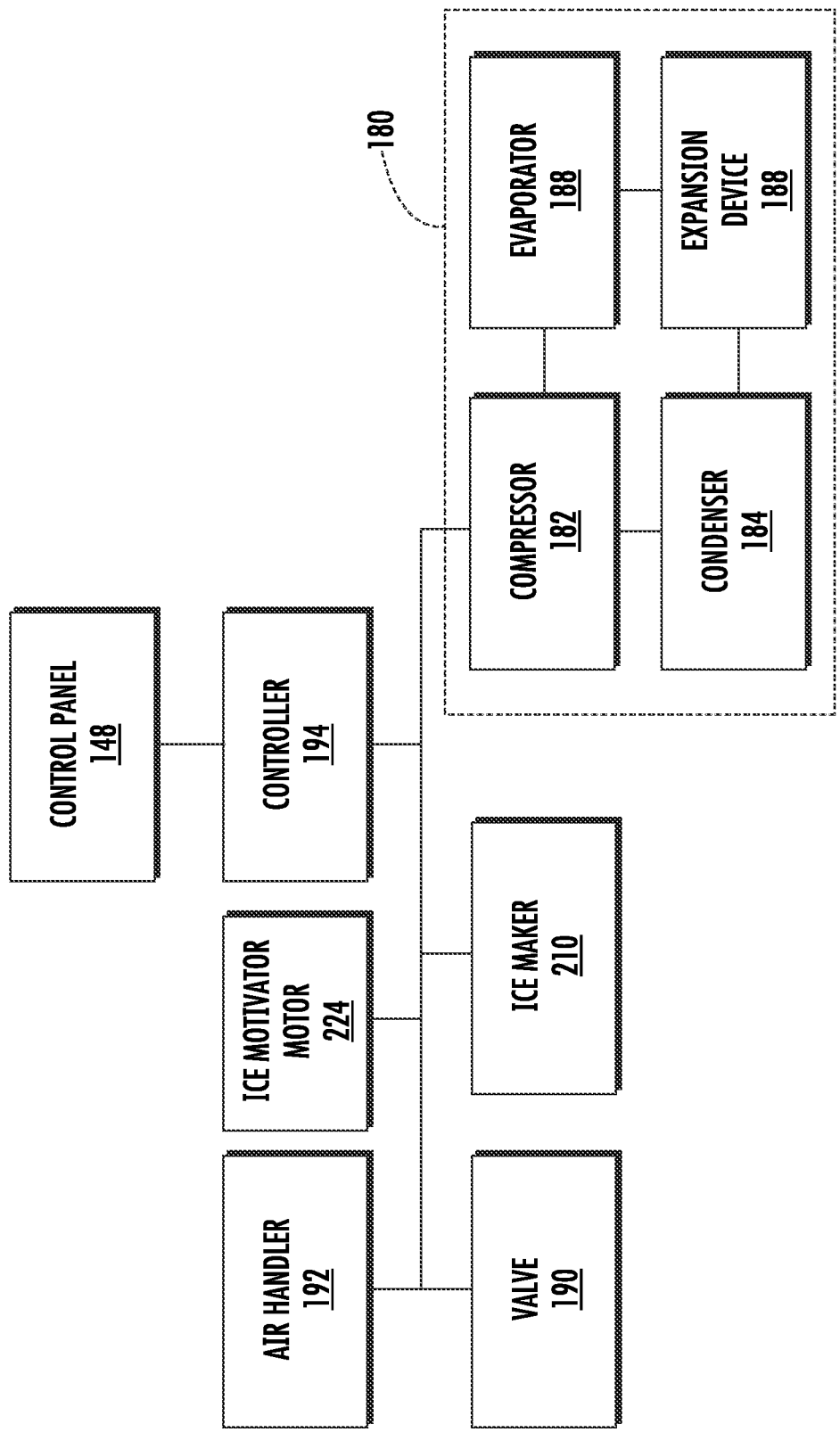
FIG. 3 provides a schematic view of a sealed cooling system of the exemplary refrigerator appliance shown in FIG. 1.
Figure 4:
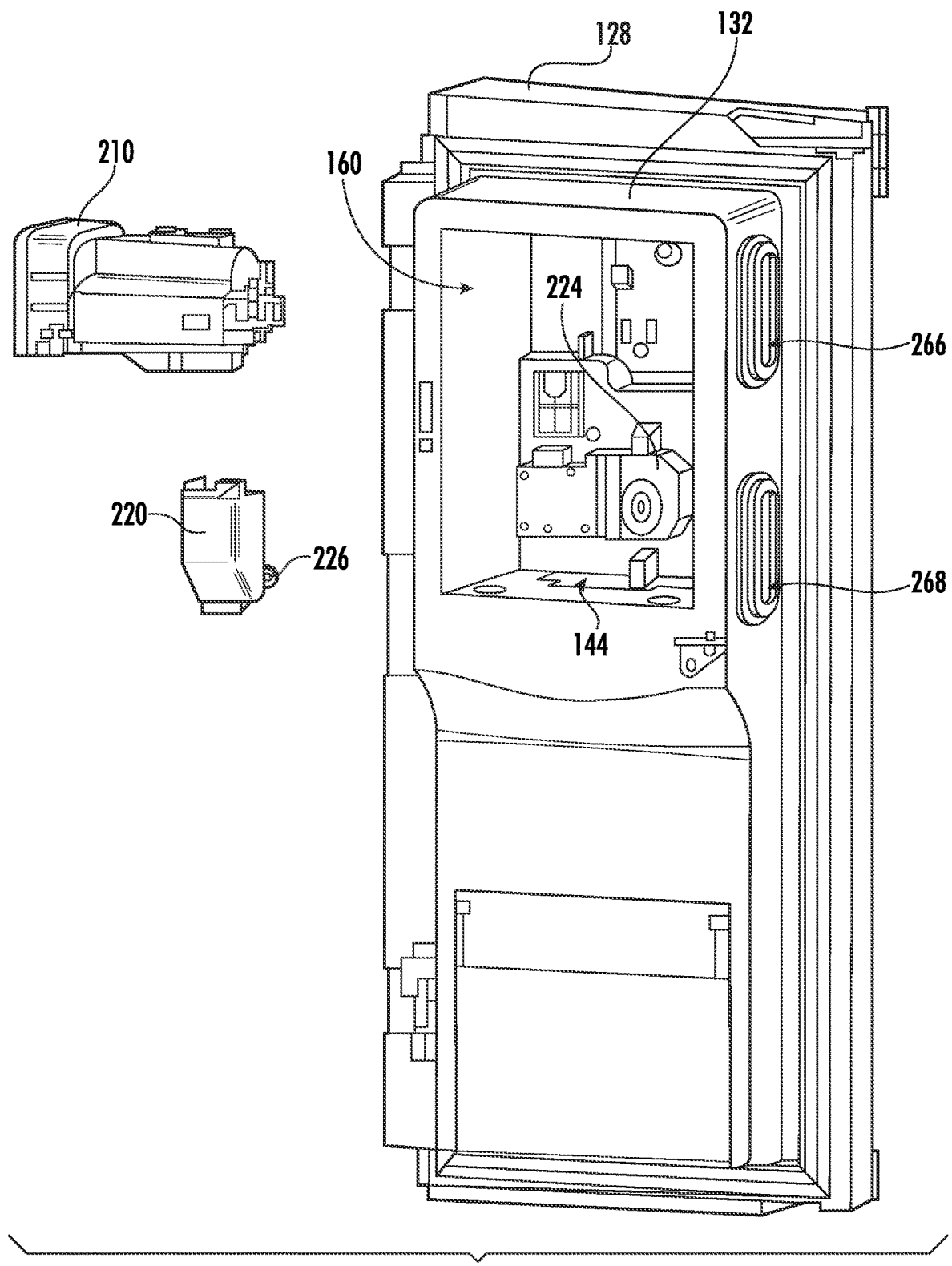
FIG. 4 provides an exploded perspective view of a portion of the refrigerator appliance door according to exemplary embodiments of the present disclosure.

FIG. 3 provides a schematic view of certain components of refrigerator appliance 100. As may be seen in FIG. 3, refrigerator appliance 100 includes a sealed cooling system 180 for executing a vapor compression cycle for cooling air within refrigerator appliance 100, e.g., within fresh food chamber 122 and freezer chamber 124. Sealed cooling system 180 includes a compressor 182, a condenser 184, an expansion device 186, and an evaporator 188 connected in fluid series and charged with a refrigerant. As will be understood by those skilled in the art, sealed cooling system 180 may include additional components, e.g., at least one additional evaporator, compressor, expansion device, or condenser. As an example, sealed cooling system 180 may include two evaporators.

Within sealed cooling system 180, gaseous refrigerant flows into compressor 182, which operates to increase the pressure of the refrigerant. This compression of the refrigerant raises its temperature, which is lowered by passing the gaseous refrigerant through condenser 184. Within condenser 184, heat exchange with ambient air takes place so as to cool the refrigerant and cause the refrigerant to condense to a liquid state.

Expansion device (e.g., a valve, capillary tube, or other restriction device) 186 receives liquid refrigerant from condenser 184. From expansion device 186, the liquid refrigerant enters evaporator 188. Upon exiting expansion device 186 and entering evaporator 188, the liquid refrigerant drops in pressure and vaporizes. Due to the pressure drop and phase change of the refrigerant, evaporator 188 is cool relative to fresh food and freezer chambers 122 and 124 of refrigerator appliance 100. As such, cooled air is produced and refrigerates fresh food and freezer chambers 122 and 124 of refrigerator appliance 100. Thus, evaporator 188 is a heat exchanger which transfers heat from air passing over evaporator 188 to refrigerant flowing through evaporator 188.

Optionally, refrigerator appliance 100 further includes a valve 190 for regulating a flow of liquid water to icemaker 210. Valve 190 is selectively adjustable between an open configuration and a closed configuration. In the open configuration, valve 190 permits a flow of liquid water to icemaker 210. Conversely, in the closed configuration, valve 190 hinders the flow of liquid water to icemaker 210.

Refrigerator appliance 100 also includes an air handler 192. Air handler 192 is operable to urge a flow of chilled air from freezer chamber 124 into icebox compartment 160, e.g., via supply and return ducts 166, 168 and chilled air openings 266, 268, as discussed below. Air handler 192 can be positioned within supply and return ducts 166, 168 of sealed cooling system 180 and be any suitable device for moving air. For example, air handler 192 can be an axial fan or a centrifugal fan.

In some embodiments, refrigerator appliance 100 further includes an ice motivator motor 224 mounted within icebox compartment 160, e.g., fixed to door liner 132. For example, ice motivator motor 224 may be a suitable electrical or hydraulic motor. One or more assembly units, such as an ice dispenser unit 220 (see FIG. 4) or ice cream unit 230 (see FIGS. 5 through 13), may be removably connected or attached to ice motivator motor 224. When one assembly unit 220, 230 is mounted within icebox compartment 160 and attached to ice motivator motor 224, ice motivator motor 224 may selectively drive or rotate a portion of the respective assembly 220, 230.

Refrigerator appliance 100 further includes a controller 194. Operation of the refrigerator appliance 100 is regulated by controller 194 that is operatively coupled to control panel 148. In one exemplary embodiment, control panel 148 may represent a general purpose I/O ("GPIO") device or functional block. In another exemplary embodiment, control panel 148 may include input components, such as one or more of a variety of electrical, mechanical or electro-mechanical input devices including rotary dials, push buttons, touch pads, and touch screens. Control panel 148 may be operably connected in communication with controller 194 via one or more signal lines or shared communication busses. Control panel 148 provides selections for user manipulation of the operation of refrigerator appliance 100. In response to user manipulation of the control panel 148, controller 194 operates various components of refrigerator appliance 100. For example, controller 194 is operatively connected or in communication with compressor 182, valve 190, ice motivator motor 224, and air handler 192, such that controller 194 can operate such components.

Controller 194 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. The processor executes programming instructions stored in the memory. For certain embodiments, the instructions include a software package configured to operate appliance 100 (e.g., according to an ice cream operation, as described below). The memory can be a separate component from the processor or can be included onboard within the processor. Alternatively, controller 194 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

Figure 5:
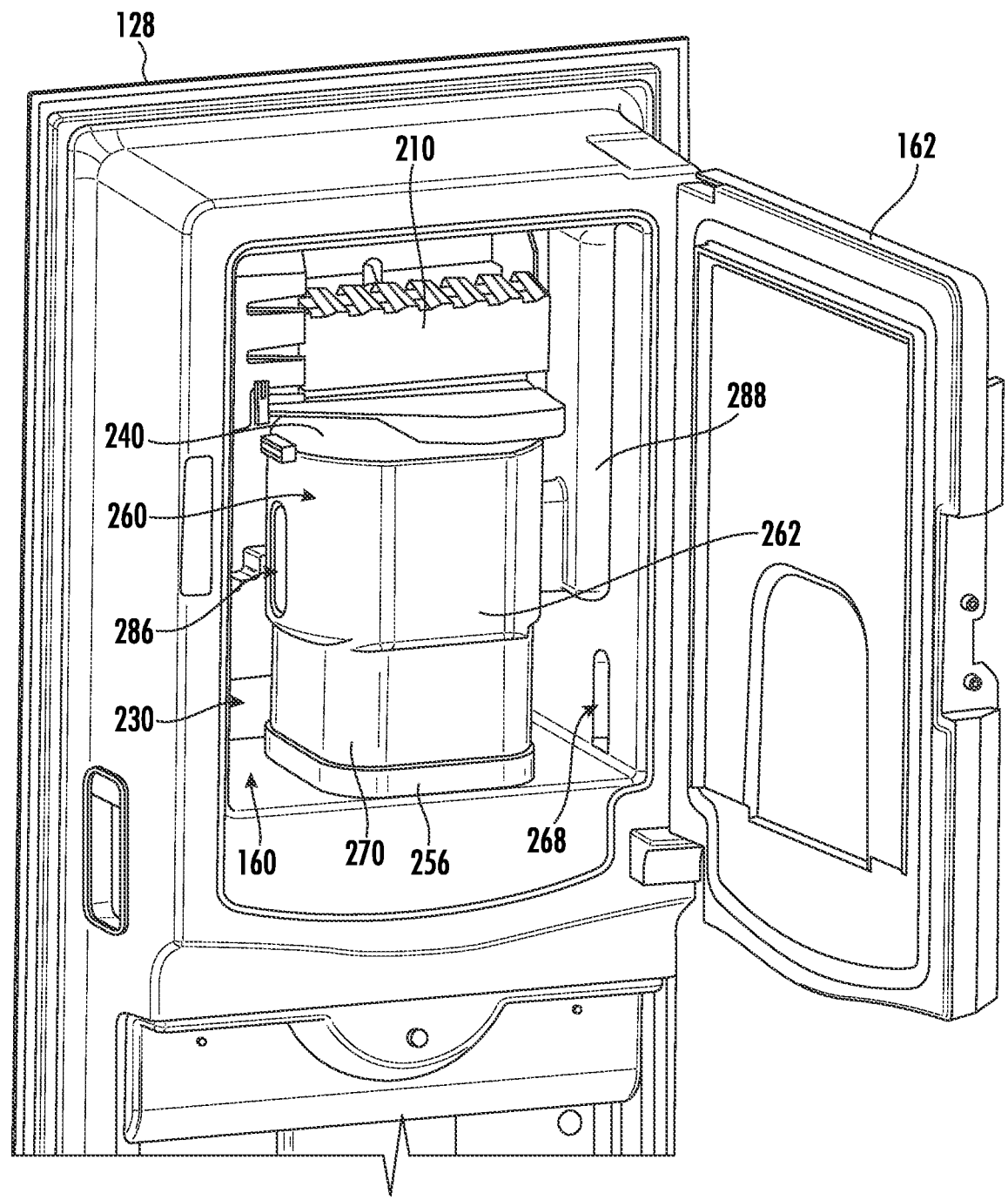
FIG. 5 provides a perspective view of the door with an ice cream unit therein.
Figure 6:
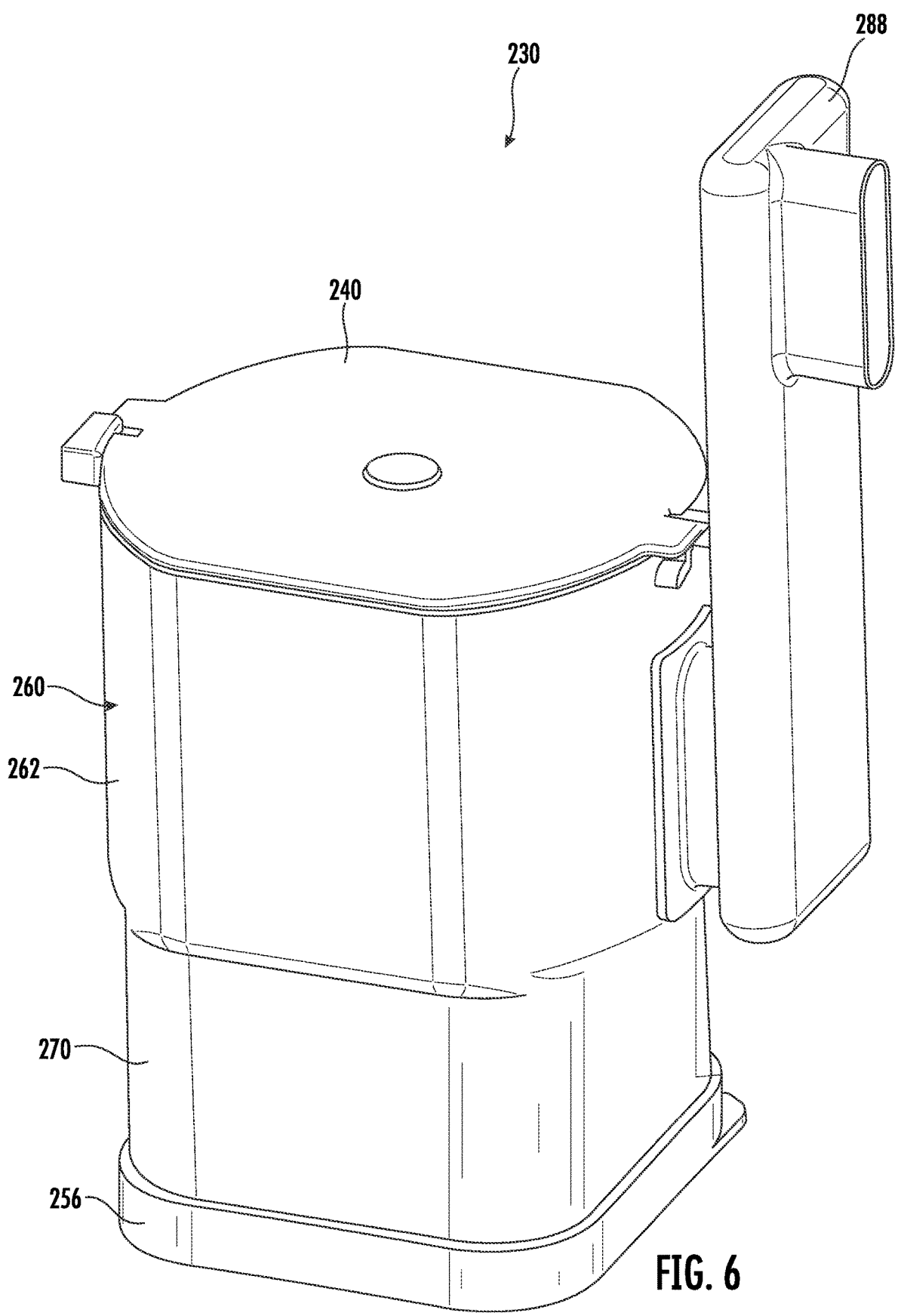
FIG. 6 provides a perspective view of an ice cream unit according to exemplary embodiments of the present disclosure.
Figure 7:
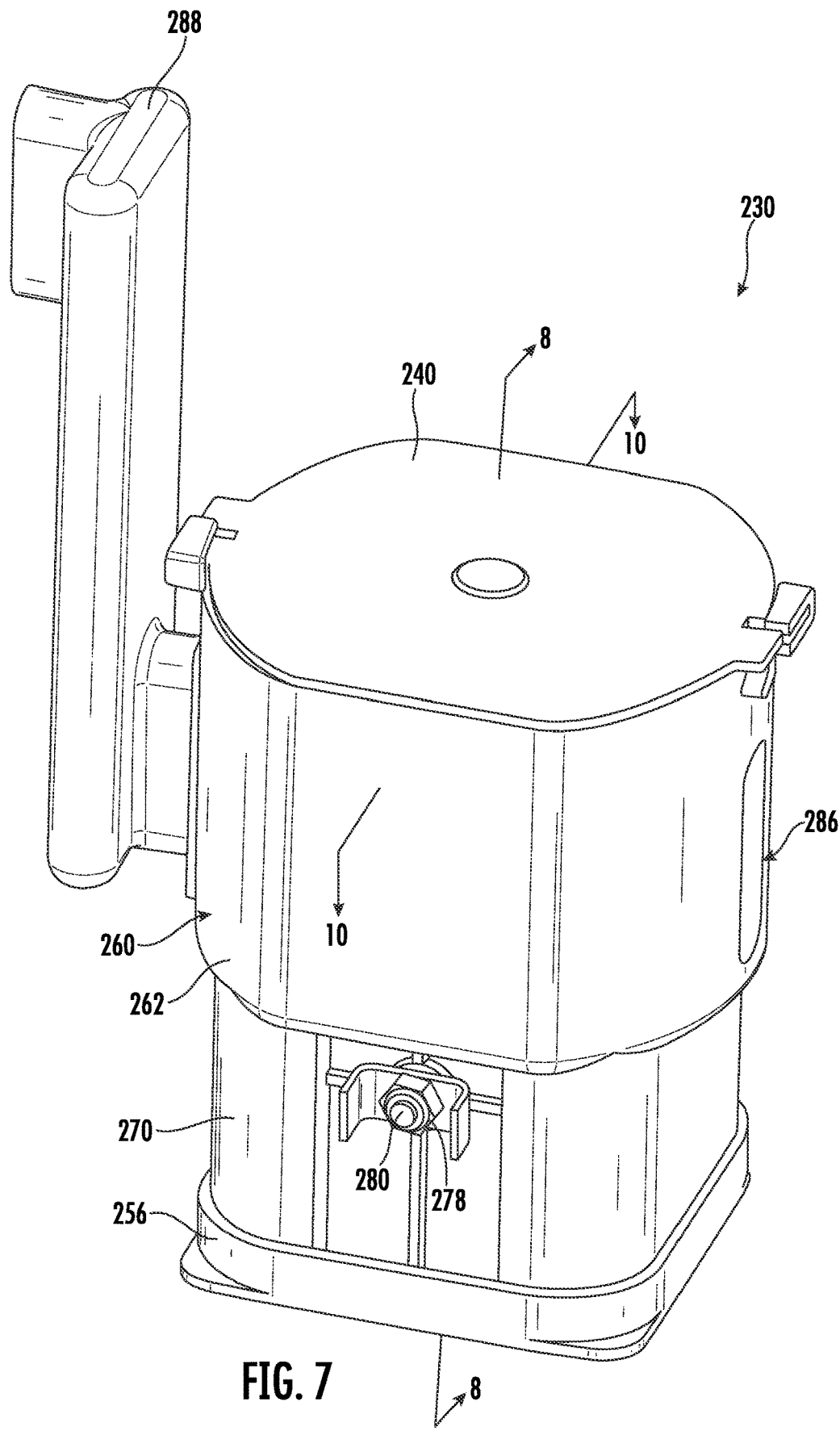
FIG. 7 provides another perspective view of the exemplary ice cream unit of FIG. 6.
Figure 8:
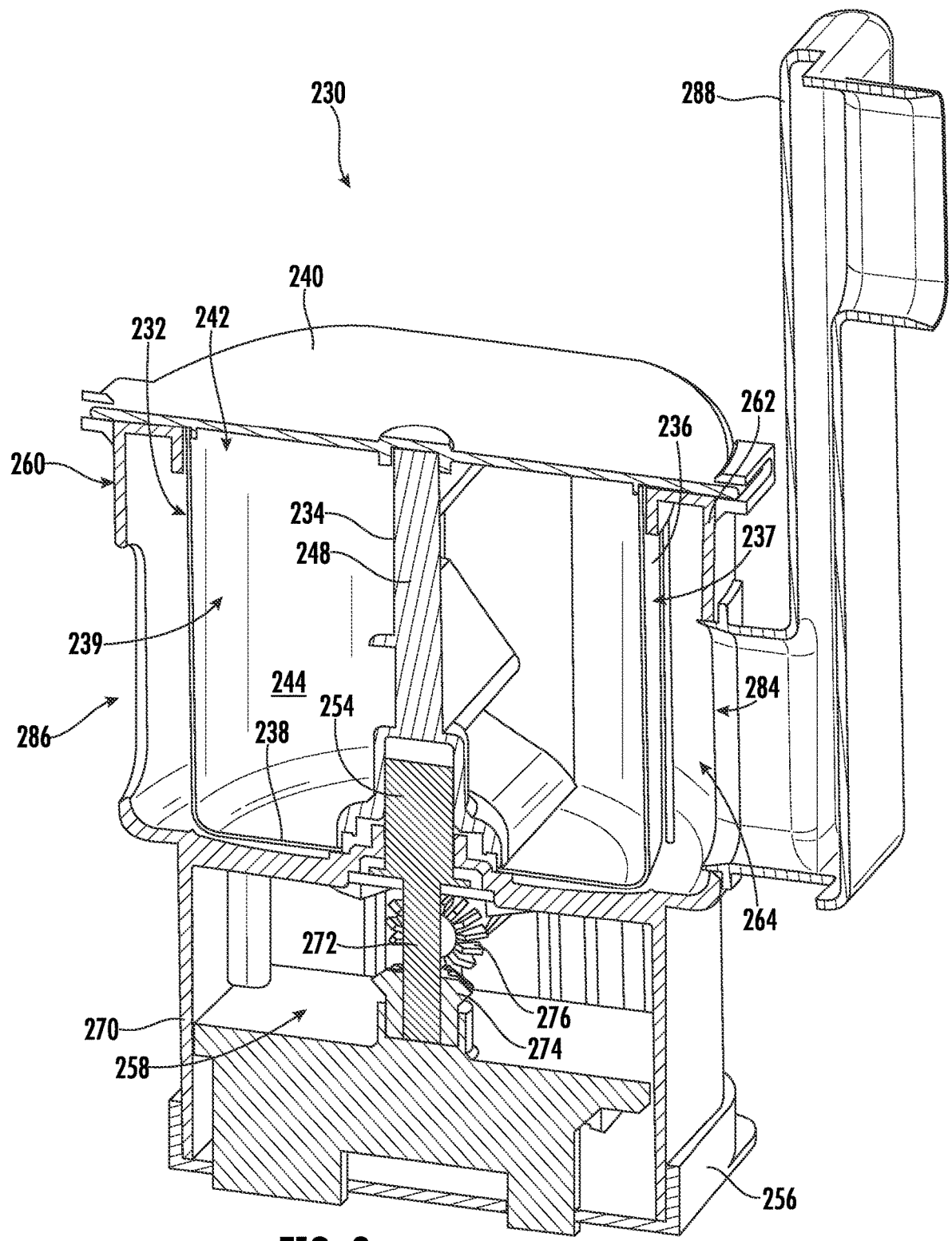
FIG. 8 provides a sectional perspective of the exemplary ice cream unit of FIG. 6, taken along the line 8-8.
Figure 9:
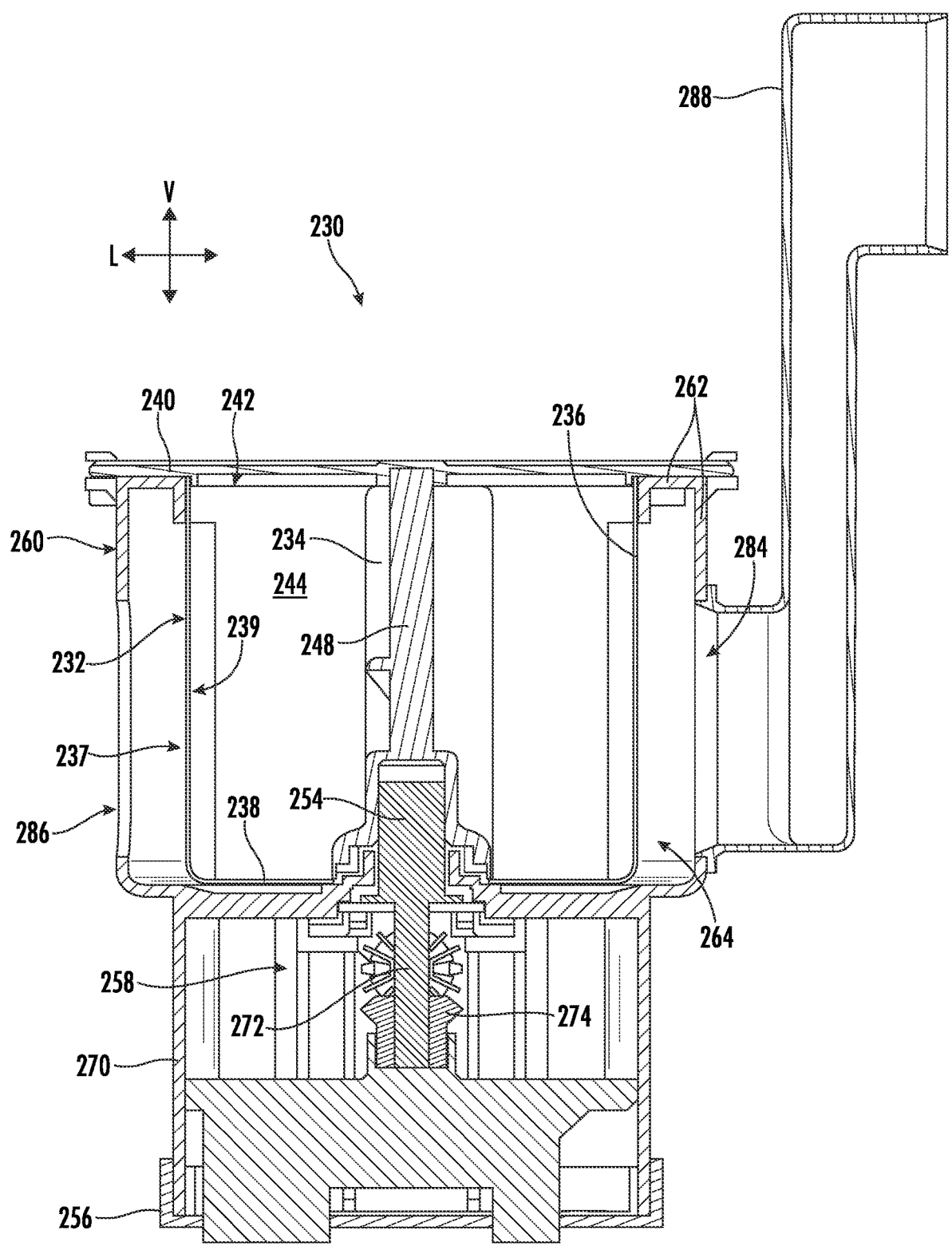
FIG. 9 provides a sectional elevation of the exemplary ice cream unit of FIG. 8.
Figure 10:
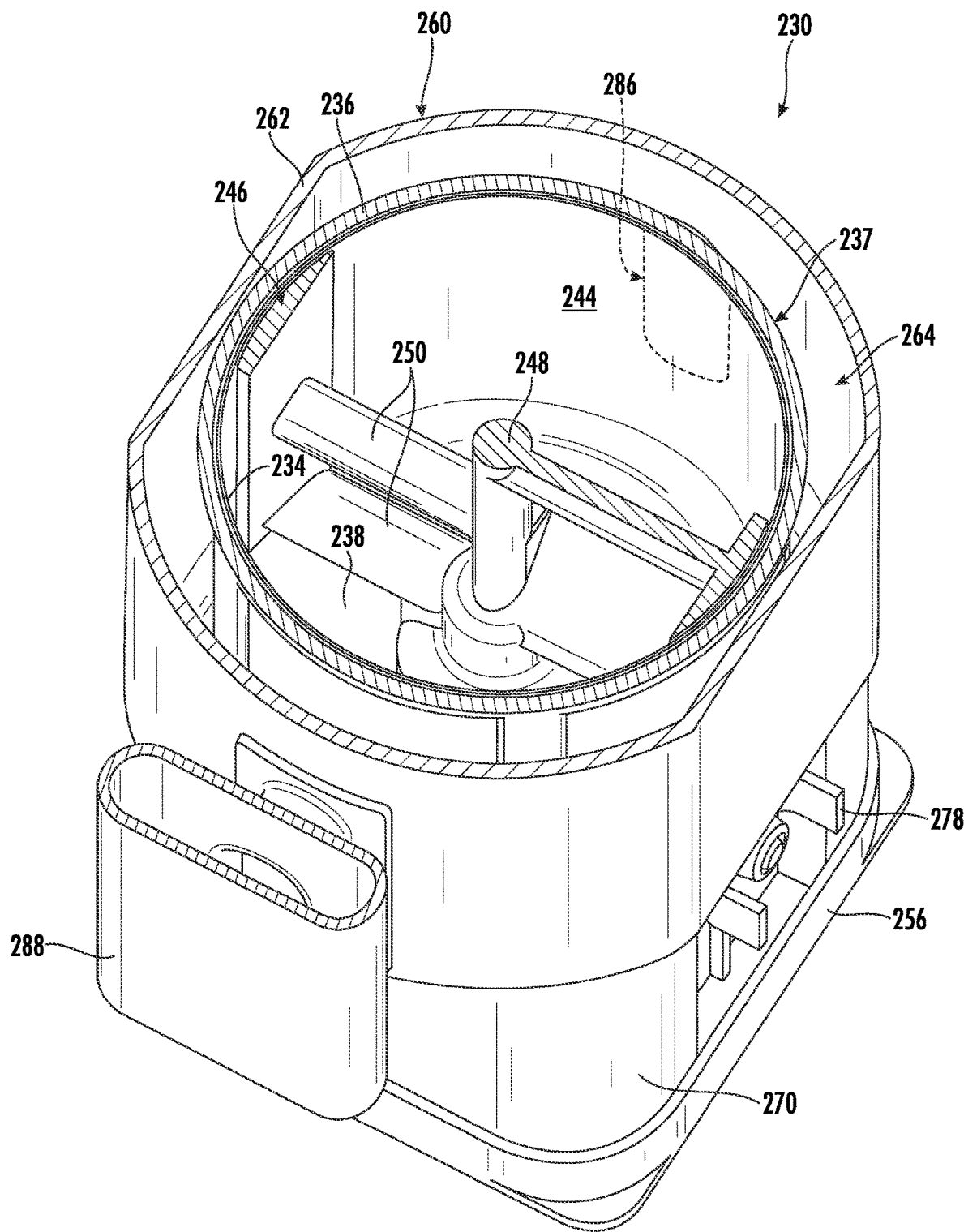
FIG. 10 provides a sectional perspective of the exemplary ice cream unit of FIG. 6, taken along the line 10-10.
Figure 11:
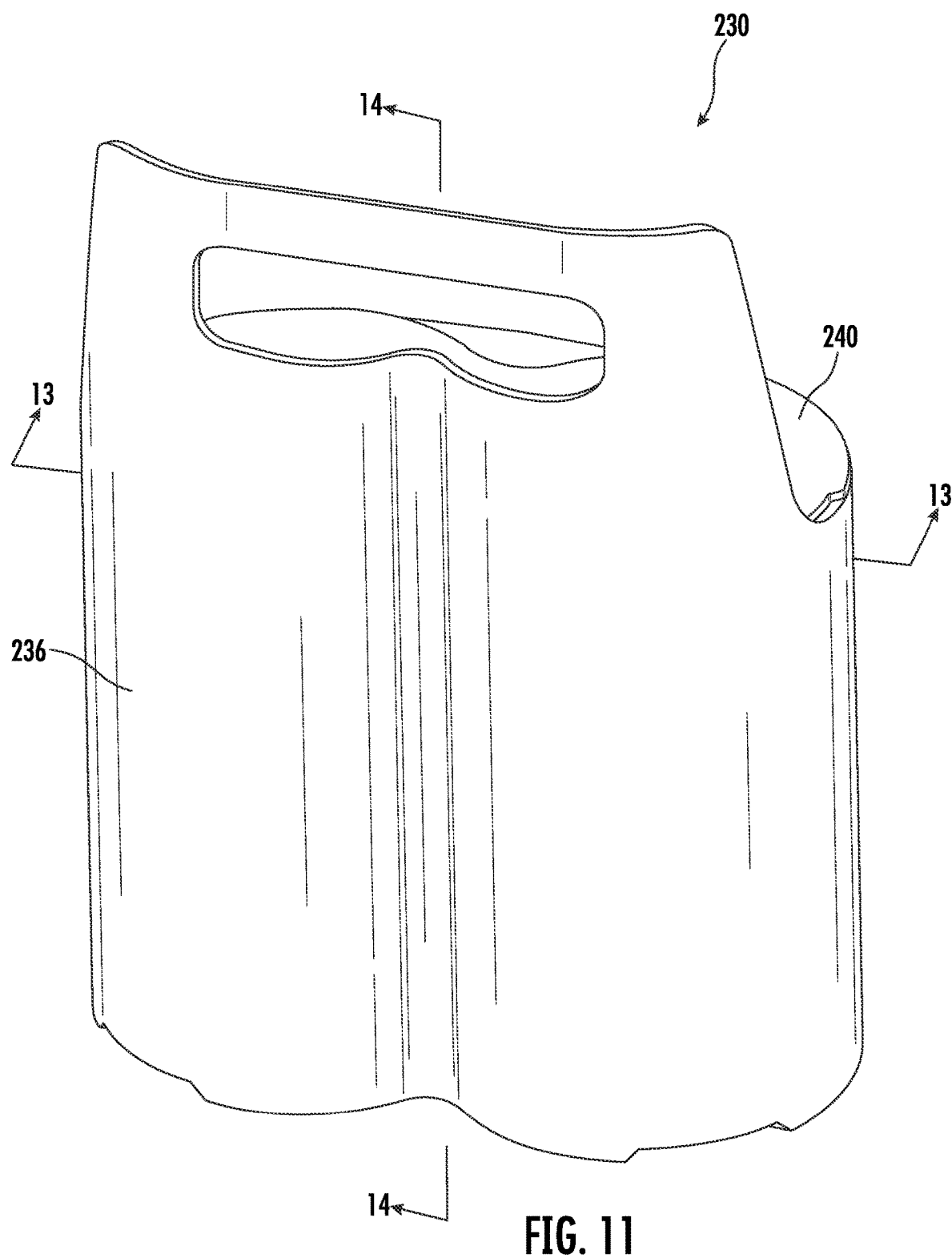
FIG. 11 provides a perspective view of an ice cream unit according to exemplary embodiments of the present disclosure.
Figure 12:
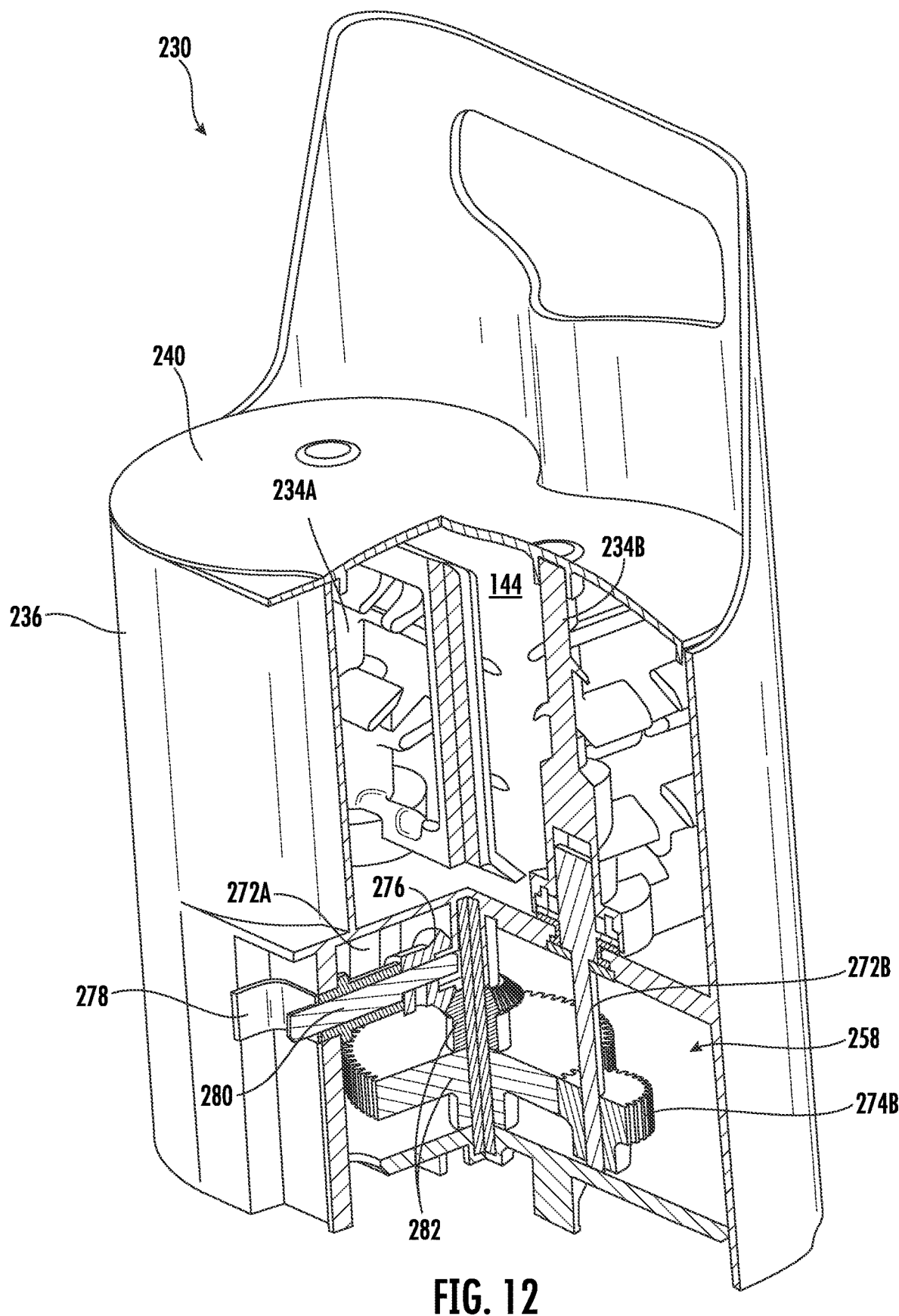
FIG. 12 provides a perspective view of the exemplary ice cream unit of FIG. 11, wherein a portion has been removed for clarity.
Figure 13:
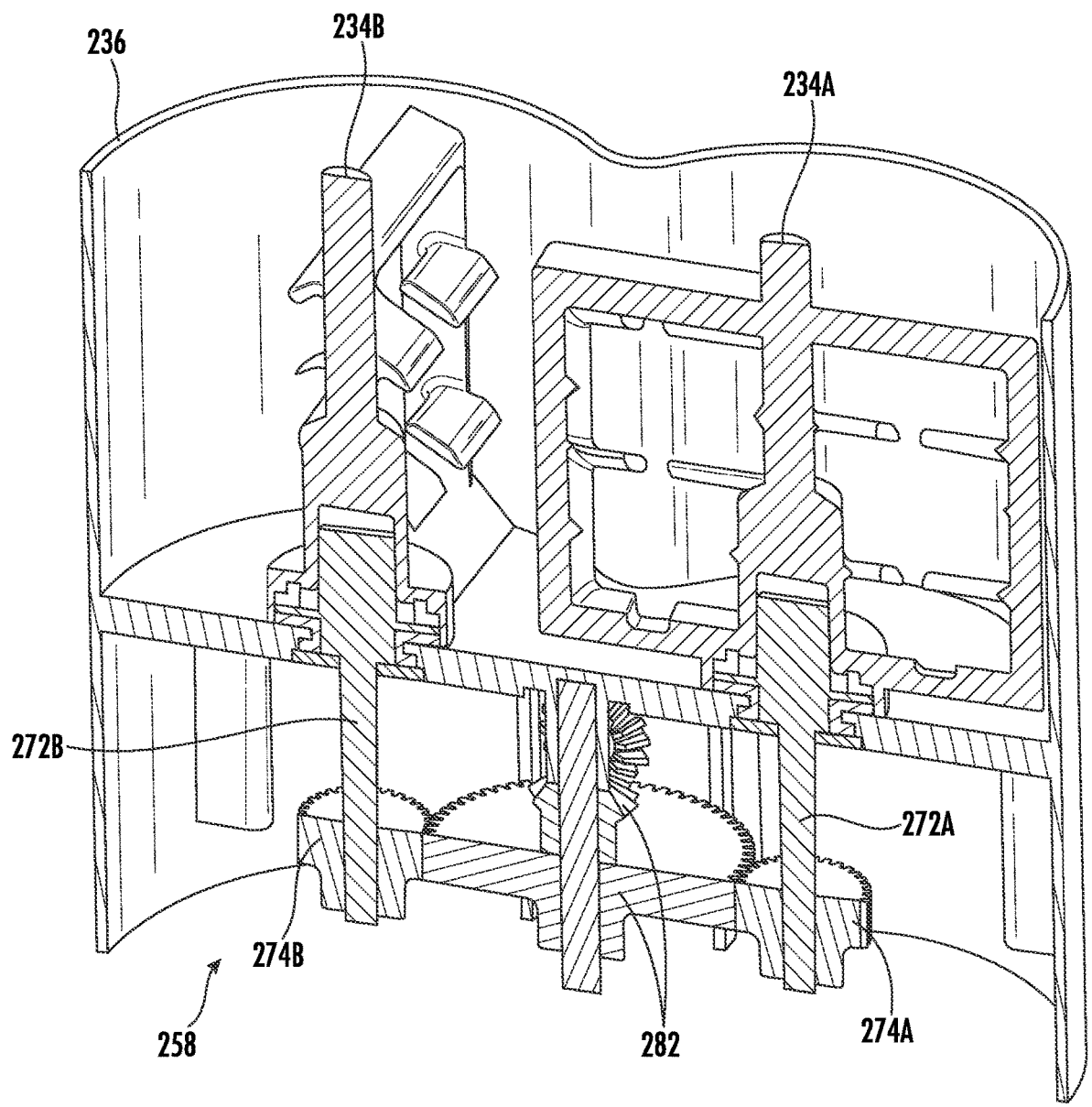
FIG. 13 provides a sectional perspective view of the exemplary ice cream unit of FIG. 11, taken along the lines 13-13.
Figure 14:
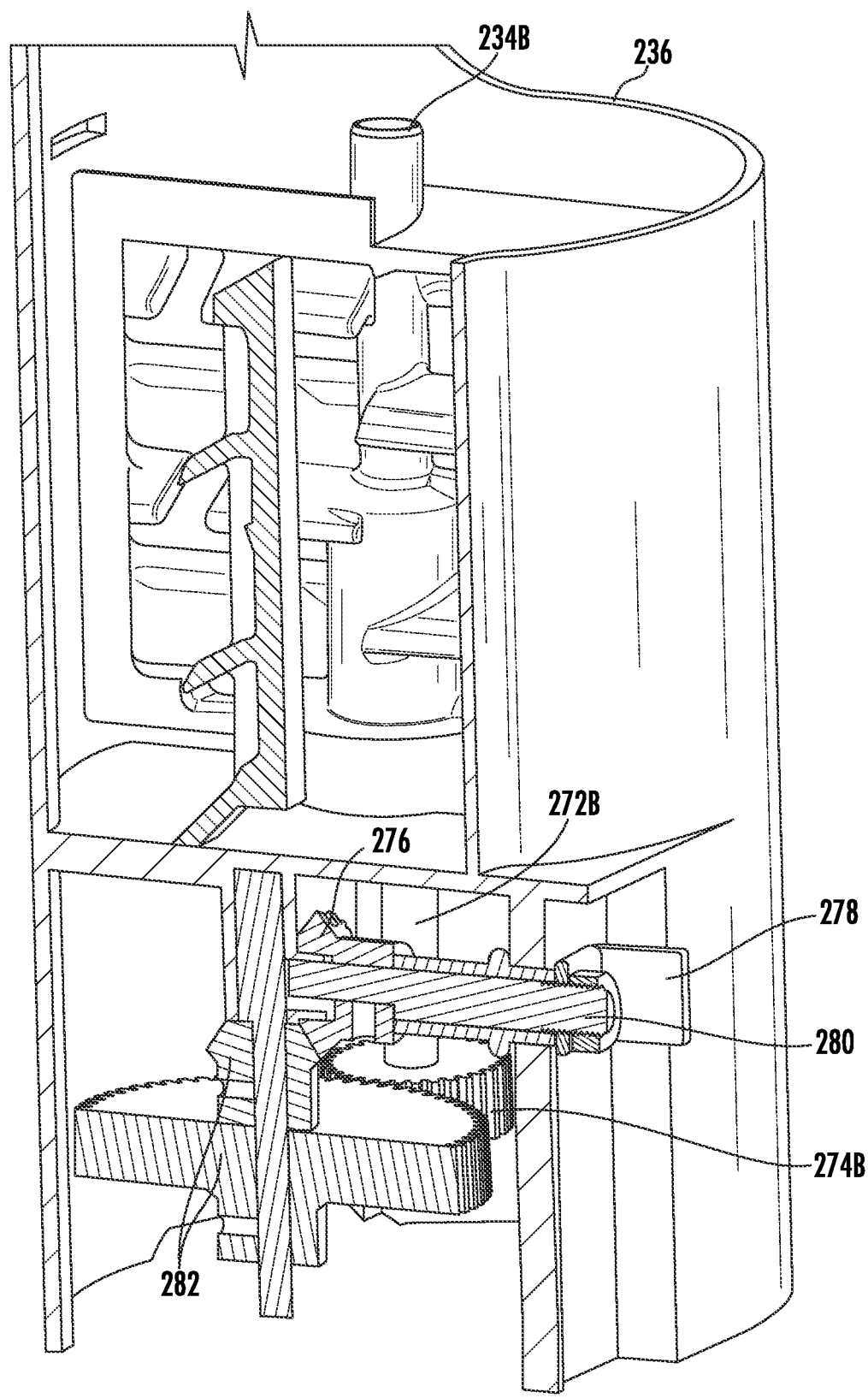
FIG. 14 provides a sectional perspective view of the exemplary ice cream unit of FIG. 11, taken along the lines 14-14.

Turning generally to FIGS. 4 and 5, exemplary embodiments of icebox compartment 160 are illustrated. As shown, some embodiments include an icemaker 210 that is disposed within icebox compartment 160. Generally, icemaker 210 is operable to form ice and may be readily attached to icebox compartment 160 using, for example, clips, fasteners, or other securing means. Icemaker 210 may include a mold body for receipt of water for freezing, as would be understood. Icemaker 210 can harvest such ice cubes and direct such ice cubes to ice dispenser unit 220. In exemplary embodiments, ice dispenser unit 220 is aligned or in communication with an ice bin (not pictured) positioned below icemaker 210 within icebox compartment 160. As shown, dispenser unit 220 may be disposed above dispenser outlet 144 defined within door 128. Generally, ice dispenser unit 220 is configured to selectively crush or propel ice being delivered from icemaker 210, e.g., via a rotatable drive rod 226 positioned through an ice bin. To that end, dispenser unit 220 may include one or more crusher blades or agitator paddles (e.g., to rotate with drive rod 226), as would be understood.

Moreover, ice dispenser unit 220 may selectively attach to door 128. In some embodiments, ice dispenser unit 220 is removably mounted within icebox compartment 160. For example, ice dispenser unit 220 may rest on a portion of door liner 132 and selectively slide in or out of icebox compartment 160 through the opening otherwise covered by icebox door 162. A user may thus mount or remove ice dispenser unit 220 as desired.

As shown, an ice motivator motor 224 may be mounted within icebox compartment 160 below icemaker 210, e.g., in the vertical direction V. Mounting ice dispenser unit 220 within icebox compartment 160 may form an operable mechanical connection with dispenser unit 220 and ice motivator motor 224. Optionally, clips, fasteners, or other securing means may be provided to further secure ice dispenser unit 220 to door liner 132. When dispenser unit 220 is mounted within icebox compartment 160, ice motivator motor 224 may operably attached to drive rod 226. Rotation of ice motivator motor 224, and thus the blades or agitator paddle joined to drive rod 226, may generally be controlled by controller 194. For instance, upon receiving input from control panel 148 (see FIG. 1), controller 194 may initiate temporary activation of ice motivator motor 224. Activation of ice motivator motor 224 may, in turn, motivate rotation of drive rod 226 and any blades or agitator paddles joined to the drive rod 226.

As shown in FIG. 5, some embodiments include an ice cream unit 230 that is disposed within icebox compartment 160. Ice cream unit 230 may be removably mounted within icebox compartment 160 and removably connected or attached to ice motivator motor 224. For example, ice cream unit 230 may rest on a portion of door liner 132 and selectively slide in or out of icebox compartment 160 through the opening otherwise covered by icebox door 162. A user may thus mount or remove ice cream unit 230 as desired. In some embodiments, ice cream unit 230 selectively replaces or is exchanged for ice dispenser unit 220 (see FIG. 4). Mounting ice cream unit 230 within icebox compartment 160 may form an operable mechanical connection a drive rod 254 and ice motivator motor 224.

Optionally, clips, fasteners, or other securing means may be provided to further secure ice cream unit 230 to door liner 132.

Generally, ice cream unit 230 is operable to hold, mix, and freeze an ice cream mixture. Ice cream unit 230 may include a freezing tank 232 and a rotatable auger 234. In some embodiments, freezing tank 232 may be formed of a conductive metal (e.g., stainless steel or aluminum, including alloys thereof) may include one or more sidewalls 236, 238 having an outer surface 237 and an inner surface 239 that define, and at least partially surround, an enclosed volume 244. For instance, some embodiments of freezing tank 232 include cylindrical sidewall 236 that extends in the vertical direction V (e.g., when mounted within icebox compartment 160). As shown, cylindrical sidewall 236 is bounded by a bottom wall 238 and may define a tank opening (e.g., at the top end) opposite of the bottom wall 238. A unit lid 240 may be selectively disposed on top of freezing tank 232 to cover tank opening 242.

As shown, rotatable auger 234 may extend into freezing tank 232, for instance, into enclosed volume 244 above bottom wall 238. Optionally, rotatable auger 234 may include one or more scraper blades 246. For instance, such scraper blades 246 may be joined to a central post 248 through one or more radial vanes 250 to slide along the inner surface 239 of cylindrical wall 236. Central post 248 itself may extend vertically from bottom wall 238. Auger 234 is operable to rotate within freezing tank 232 about a drive rod 254 or vertical axis. When ice cream unit 230 is mounted within icebox compartment 160, rotatable auger 234 may operably attach to ice motivator motor 224. In turn, activation of ice motivator motor 224 may force auger 234 to rotate within freezing tank 232. Alternatively, a dedicated motor may be provided (e.g., within a casing 270) to directly rotate auger 234, as would be understood in light of the present disclosure.

In some embodiments, a power train 258 is provided in operable attachment with auger 234 and ice motivator motor 224. Power train 258 may be mounted to a casing 270 disposed below freezing tank 232, e.g., at the bottom wall 238, to join auger 234 to motor 224. Optionally, power train 258 may be fixed to bottom wall 238. Generally, power train 258 includes one or more drive shafts and gears to redirect rotation of the ice motivator motor 224 to rotate auger 234.

In the illustrated embodiment, power train 258 includes a connection rod 272 that extends through bottom wall 238 and is joined to or received with drive rod 254 onto which auger 234 may be received (e.g., at mated sleeve defined by central post 248). Moreover, a post gear 274 may be connected to connection rod 272. As shown, a stabilizer base fixed within casing 270 may anchor or horizontally support connection rod 272 or post gear 274. When assembled, post gear 274 may be fixed to connection rod 272 and rotatable about the vertical axis of auger 234. In some such embodiments, rotation of post gear 274 may be directly transferred to auger 234.

In certain embodiments, a drive gear 276 is positioned in mechanical communication with post gear 274 (e.g., such that post gear 274 is in mechanical communication between connection rod 272 and drive gear 276). For instance, drive gear 276 and post gear 274 may both include a plurality of gear teeth that are enmeshed in mechanical communication with each other. When assembled, drive gear 276 may be rotatable about a unique drive axis (e.g., coaxial or parallel with the axis of drive motor 224) that is not parallel to the vertical axis of auger 234. Optionally, one or both of post gear 274 and drive gear 276 may be provided as bevel gears.

In certain embodiments, an adapter key 278 is connected to drive gear 276 through casing 270. For instance, a gear shaft 280 may extend through casing 270 from drive gear 276 to adapter key 278. In some such embodiments, gear shaft 280 and adapter key 278 are both fixed to drive gear 276 and rotatable about drive axis E. When ice cream unit 230 is positioned on refrigerator appliance (e.g., attached to a door 128), adapter key 278 may engage ice motivator motor 224 in a horizontal connection beside casing 270. Adapter key 278 may thus establish mechanical communication between ice motivator motor 224 and power train 258. During use, ice motivator motor 224 may motivate rotation of adapter key 278 and drive gear 276 about the drive axis, which in turn motivates rotation of post gear 274 and auger 234. The horizontal connection between ice motivator motor 224 and power train 258 may permit ice cream unit 230 to slide horizontally (i.e., perpendicular to the vertical direction V) into attachment with refrigerator appliance 100 without requiring any vertical movement or motion from ice cream unit 230. Advantageously, a user may attach or remove ice cream unit 230 from refrigerator appliance 100 without lifting ice cream unit 230 up and over ice motivator motor 224.

Turning briefly to FIGS. 11 through 14, it is noted that power train 258 may optionally be configured to rotate multiple discrete augers 234A, 234B. For instance, a discrete first auger 234A and second auger 234B may both be provided in mechanical communication with power train 258. As shown, first and second augers 234A, 234B may be disposed in parallel with each other (e.g., to rotate about parallel vertical axes). Power train 258 may provide corresponding first and second connection rods 272A, 272B to receive or connect the augers 234A, 234B. Moreover, discrete first and second post gears 274A, 274B may be joined to the corresponding connection rods 272A, 272B. Optionally, one or more intermediate gears 282 may communicate or enmesh with drive gear 276 such that the connection rods 272A, 272B and augers 234A, 234B are driven simultaneously by a single source (e.g., motor 224).

Returning especially to FIGS. 5 through 10, in some embodiments, ice cream unit 230 includes a tank jacket 260 (e.g., joined to casing 270). As shown, tank jacket 260 may include a jacket wall 262 that receives and surrounds freezing tank 232. Tank jacket 260 may be formed from a separate material from freezing tank 232 (e.g., an insulative polymer). Between jacket wall 262 and the outer surface of freezing tank 232, a cooling passage 264 may be defined. Generally, the cooling passage 264 extends about freezing tank 232 from a jacket inlet 284 to a jacket outlet 286. Thus, cooling passage 264 may define an air flow path about the outer surface 239 of the freezing tank 232. During operation, chilled air may be selectively provided along the air flow path to promote an even or consistent heat transfer from the ice cream mixture, e.g., via freezing tank 232. For instance, chilled air may be directed along the cooling passage 264 before continuing about a portion of cylindrical sidewall 236.

In some embodiments, tank jacket 260 defines a chilled air inlet 266 and a chilled air outlet 268 that direct air into and out of tank jacket 260, respectively. For instance, chilled air inlet 266 and chilled air outlet 268 may both be defined through jacket wall 262. In some embodiments, chilled air inlet 266 and chilled air outlet 268 are laterally spaced apart, such as at opposite lateral sides of freezing tank 232. Thus, the flow of chilled air may encircle freezing tank 232 before being exhausted to the ice compartment 160 from jacket outlet 286.

As shown, when ice cream unit 230 is mounted within icebox compartment 160, chilled air inlet 266 is in fluid communication with chilled air supply duct 166 (see FIG. 2). Chilled air inlet 266 is positioned downstream from chilled air supply duct and upstream from a remainder of tank jacket 260. In some such embodiments, chilled air outlet 268 is in fluid communication with chilled air return duct 168. Chilled air outlet 268 is positioned upstream from chilled air return duct 168 and downstream from a remainder of tank jacket 260. During use, chilled air may be selectively supplied to chilled air inlet 266 before flowing along cooling passage 264 and through chilled air outlet 268.

In certain embodiments, a unit duct 288 extends (e.g., directly) from the chilled air supply opening 134 to the jacket inlet 284. The unit duct 288 may seal the passage of air from chilled air supply opening 134 to jacket inlet 284, directing air along a focused flow path. The unit duct 288 may thus ensure that substantially all of the air from the chilled is directed to the cooling passage 264. In some embodiments, the unit duct 288 may extend downward (e.g., vertically), such as in a linear S-shape, to bypass the icemaker 210 and guide chilled air toward the ice cream unit 230 disposed at lower vertical height than chilled air inlet 266. Notably, unit duct 288 and tank jacket 260 may ensure chilled air flows primarily over freezing tank 232, thereby facilitating the freezing of the ice cream mixture (e.g., without the need to supplemental heat transfer elements, ice, salt, etc.).

In optional embodiments, a support base 256 is included with ice cream unit 230 (e.g., at a bottom portion thereof). For instance, support base 256 may hold one or more other portions of ice cream unit 230, such as casing 270 or tank jacket 260. Support base 256 may be a solid non-permeable member. Moreover, when installed within icebox compartment 160, support base 256 may be disposed above and cover dispenser outlet 144. Specifically, support base 256 may seal against a surrounding portion of the liner of icebox compartment 160, thereby blocking air from exiting the icebox compartment 160 (e.g., through dispenser outlet 144) with installation of ice cream unit 230.

Returning generally to FIGS. 5 through 14, controller 194 may be operably connected to ice motivator motor 224. In some embodiments, controller 194 is configured to control operation of ice motivator motor 224 according to one or more predetermined ice cream modes. For instance, controller 194 may be configured to initiate an ice cream mode based on one or more inputs or signals received from control panel 148 (see FIG. 1). Multiple discrete ice cream modes may be provided for certain corresponding or operational factors (e.g., reducing energy use). Optionally, specific ice cream modes may be selected via user input, e.g., at control panel 148. According to the ice cream mode, controller 194 may subsequently activate or adjust one or more other components of refrigerator appliance 100. Other components, such as icemaker 210 may be prevented from operating, such as by halting signals thereto.

In some embodiments, initiating an ice cream mode includes activating ice motivator motor 224 to rotate auger 234. In response to initiating the ice cream mode, controller 194 may be configured to activate ice motivator motor 224 for a predetermined time period or open-ended time period. Optionally, activation of ice motivator motor 224 in the ice cream mode may be dependent on or based on motor resistance. For instance, as the ice cream mixture freezes, the voltage draw at ice motivator motor 224 may increase. In turn, the ice cream mode may include detecting motor resistance (e.g., voltage draw) during continuous activation of the ice motivator motor 224. Subsequently, the mode may include halting continuous activation of the ice motivator motor 224 based on the detected motor resistance. For instance, if the detected motor resistance meets or exceeds a predetermined threshold (e.g., threshold voltage value), rotation of the auger 234 or motor 224 may be halted.

In certain exemplary embodiment wherein controller 194 is configured to activate ice motivator motor 224 in response to input from actuating mechanism 146 or control panel 148 (see FIG. 1), controller 194 may be configured to disregard or override select input signals from actuating mechanism 146 (see FIG. 1) when in the ice cream mode. Activation of ice motivator motor 224 may be selectively decoupled from certain inputs or instructions at actuating mechanism 146 or control panel 148 when ice dispenser unit 220 is mounted within icebox compartment 160.

In additional or alternative embodiments, initiating the predetermined ice cream mode includes activating rotation of air handler 192 or compressor 182 (see FIG. 3). Air handler 192 may be activated to rotate or motivate chilled air through icebox compartment 160. Activation or operation of air handler 192 may be for continuous operation or operation may be limited to a predetermined time period. Moreover, activation or operation of air handler 192 may be further based upon one or more monitored conditions (e.g., detected resistance of the ice motivator motor 224). Advantageously, ice cream may be prepared or maintained with minimal user effort. In some such embodiments, a determination of desired air flow is made by controller 194.

Additionally or alternatively, compressor 182 may be activated to motivate refrigerant through sealed cooling system 180 and cool air directed to air handler 192. Activation or operation of compressor 182 may be for continuous operation or operation may be limited to a predetermined time period. Activation or operation of compressor 182 may be concurrent with or separate from activation of air handler 192. Moreover, activation or operation of compressor 182 may be further based upon one or more monitored conditions (e.g., detected resistance of the ice motivator motor 224).

Optionally, a visual or audio alert may be initiated in response to halting motor rotation or otherwise determining the ice cream has reached a desired consistency. The visual or audio alert may include any suitable indication alert, such as an illuminated light, a predetermined noise projected from a speaker, or a message presented on an electronic display. As an example, controller 194 may initiate an alert via an alert signal transmitted to an illuminated LED on control panel 148. The signal transmission may occur once controller 194 has determined a desired beverage consistency has been reached according to the contemporary rotating speed of auger 234.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;

a door attached to the cabinet to selectively restrict access to the chilled chamber, the door comprising a door liner defining an icebox compartment, the door further comprising a chilled air supply opening and a chilled air return opening spaced apart from the chilled air supply opening;
a sealed cooling system in fluid communication with the icebox compartment to circulate air within the refrigerator appliance; and
an ice cream unit disposed within the icebox compartment, the ice cream unit comprising
a freezing tank,
a rotatable auger extending into the freezing tank,
a tank jacket receiving the freezing tank and defining a cooling passage extending about and thereby encircling the freezing tank from a top to a bottom of the freezing tank along a path from a jacket inlet to a jacket outlet, the jacket outlet being open to the icebox compartment to exhaust air from the cooling passage to the icebox compartment, and
a unit duct extending from the chilled air supply opening to the jacket inlet to direct air from the chilled air supply opening to the cooling passage.

2. The refrigerator appliance of claim 1, wherein the jacket inlet is spaced apart from the jacket outlet along a lateral direction.

3. The refrigerator appliance of claim 1, further comprising:
an icemaker mounted within the icebox compartment adjacent to the ice cream unit.

4. The refrigerator appliance of claim 3, wherein the icemaker is mounted at a common vertical height with the chilled air supply opening.

5. The refrigerator appliance of claim 1, wherein the door further defines a dispenser outlet below the chilled air supply opening, and wherein the ice cream unit further comprises a support base holding the tank jacket, the support base being disposed above and covering the dispenser outlet to block air from the icebox compartment.

6. The refrigerator appliance of claim 1, further comprising an ice motivator motor mounted to the door, the ice motivator motor defining a horizontal rotation axis, wherein the rotatable auger defines a vertical rotation axis, and wherein the ice cream unit further comprises a power train operably attaching the ice motivator motor to the rotatable auger.

7. The refrigerator appliance of claim 6, wherein the rotatable auger is a first auger, and wherein the ice cream unit further comprises a second auger extending within the freezing tank in parallel to the first auger, the second auger and the first auger being in mechanical communication with the power train.

8. The refrigerator appliance of claim 6, further comprising:
a controller operably connected to the ice motivator motor and configured to control operation of the ice motivator motor according to a predetermined ice cream mode, the ice cream mode comprising
directing continuous activation of the ice motivator motor to rotate the rotatable auger.

9. The refrigerator appliance of claim 8, wherein the ice cream mode further comprises
detecting motor resistance during continuous activation of the ice motivator motor, and
halting continuous activation of the ice motivator motor based on the detected motor resistance.

10. The refrigerator appliance of claim 9, wherein the sealed cooling system comprises an air handler in fluid communication with the chilled air supply opening and the chilled air return opening, and wherein initiating the predetermined ice cream mode comprises activating rotation of the air handler.

11. A refrigerator appliance comprising:
a cabinet defining a chilled chamber;
a door attached to the cabinet to selectively restrict access to the chilled chamber, the door comprising a door liner defining an icebox compartment, the door further comprising a chilled air supply opening, a chilled air return opening spaced apart from the chilled air supply opening, and a dispenser outlet spaced apart from the chilled air supply opening and the chilled air return opening;
a sealed cooling system in fluid communication with the icebox compartment to circulate air within the refrigerator appliance; and
an ice cream unit disposed within the icebox compartment, the ice cream unit comprising
a freezing tank,
a rotatable auger extending into the freezing tank,
a tank jacket receiving the freezing tank and defining a cooling passage extending about and thereby encircling the freezing tank from a top to a bottom of the freezing tank along a path from a jacket inlet to a jacket outlet, the jacket outlet being open to the icebox compartment to exhaust air from the cooling passage to the icebox compartment, and
a support base holding the tank jacket, the support base being disposed above and covering the dispenser outlet to block air from the icebox compartment.

12. The refrigerator appliance of claim 11, wherein the jacket inlet is spaced apart from the jacket outlet along a lateral direction.

13. The refrigerator appliance of claim 11, further comprising:
an icemaker mounted within the icebox compartment adjacent to the ice cream unit.

14. The refrigerator appliance of claim 13, wherein the icemaker is mounted at a common vertical height with the chilled air supply opening.

15. The refrigerator appliance of claim 11, further comprising:
an ice motivator motor mounted to the door, the ice motivator motor defining a horizontal rotation axis, wherein the rotatable auger defines a vertical rotation axis, and wherein the ice cream unit further comprises a power train operably attaching the ice motivator motor to the rotatable auger.

16. The refrigerator appliance of claim 15, wherein the rotatable auger is a first auger, and wherein the ice cream unit further comprises a second auger extending within the freezing tank in parallel to the first auger, the second auger and the first auger being in mechanical communication with the power train.

17. The refrigerator appliance of claim 15, further comprising:
a controller operably connected to the ice motivator motor and configured to control operation of the ice motivator motor according to a predetermined ice cream mode, the ice cream mode comprising
directing continuous activation of the ice motivator motor to rotate the rotatable auger.

18. The refrigerator appliance of claim 17, wherein the ice cream mode further comprises detecting motor resistance during continuous activation of the ice motivator motor, and halting continuous activation of the ice motivator motor based on the detected motor resistance.

19. The refrigerator appliance of claim 17, wherein the sealed cooling system comprises an air handler in fluid communication with the chilled air supply opening and the chilled air return opening, and wherein initiating the predetermined ice cream mode comprises activating rotation of the air handler.

20. A refrigerator appliance comprising:

a cabinet defining a chilled chamber;

a door attached to the cabinet to selectively restrict access to the chilled chamber, the door comprising a door liner defining an icebox compartment, the door further comprising a chilled air supply opening, a chilled air return opening spaced apart from the chilled air supply opening, and a dispenser outlet spaced apart from the chilled air supply opening and the chilled air return opening, the dispenser outlet being configured for ice delivery to an ambient environment;

a sealed cooling system in fluid communication with the icebox compartment to circulate air within the refrigerator appliance; and an ice cream unit disposed within the icebox compartment, the ice cream unit comprising a freezing tank, a rotatable auger extending into the freezing tank, a tank jacket receiving the freezing tank and defining a cooling passage extending about and thereby encircling the freezing tank the freezing tank along a path from a jacket inlet to a jacket outlet, the jacket outlet being open to the icebox compartment to exhaust air from the cooling passage to the icebox compartment, and a support base holding the tank jacket, the support base being disposed above and sealing the dispenser outlet to block air and ice from passing through the dispenser outlet between the icebox compartment and the ambient environment.

* * * * *